(12) United States Patent
Scheir

(10) Patent No.: US 7,997,496 B2
(45) Date of Patent: Aug. 16, 2011

(54) LAMINATED PRINTABLE MULTI-LAYER CARD WITH ENTRAPPED SECURITY ELEMENT

(76) Inventor: Peter L. Scheir, North Haven, CT (US)

(*) Notice: Subject to any disclaimer, the term of this patent is extended or adjusted under 35 U.S.C. 154(b) by 1156 days.

(21) Appl. No.: 11/653,220

(22) Filed: Jan. 16, 2007

(65) Prior Publication Data
US 2008/0169640 A1    Jul. 17, 2008

(51) Int. Cl.
*G06K 19/02* (2006.01)
(52) U.S. Cl. ....................................................... 235/488
(58) Field of Classification Search .................... 235/488
See application file for complete search history.

(56) References Cited

U.S. PATENT DOCUMENTS

| | | | |
|---|---|---|---|
| 4,441,945 A | 4/1984 | Moraw et al. | |
| 4,560,426 A | 12/1985 | Moraw et al. | |
| 4,597,814 A | 7/1986 | Colgate, Jr. | |
| 5,037,101 A | 8/1991 | McNulty | |
| 5,066,047 A | 11/1991 | Mailloux et al. | |
| 5,251,937 A * | 10/1993 | Ojster | 283/91 |
| 5,318,816 A | 6/1994 | Yin et al. | |
| 5,838,466 A | 11/1998 | Mallik | |
| 6,113,149 A | 9/2000 | Dukatz | |
| 6,196,383 B1 | 3/2001 | Pinchen et al. | |
| 6,318,757 B1 | 11/2001 | Ritchie et al. | |
| 6,663,945 B2 | 12/2003 | Miyano | |
| 6,722,700 B1 | 4/2004 | Christen | |
| 7,362,523 B2 * | 4/2008 | Takeyama | 430/117.1 |
| 2001/0000741 A1 | 5/2001 | Pinchen et al. | |
| 2003/0127847 A1 | 7/2003 | Keller et al. | |

* cited by examiner

*Primary Examiner* — Jamara A Franklin
(74) *Attorney, Agent, or Firm* — Leander F. Aulisio

(57) ABSTRACT

A laminated multi-layer card that can be imprinted with personal information, the card containing an entrapped security element; the security element containing a pressure sensitive adhesive layer.

16 Claims, 9 Drawing Sheets

LAMINATED PRINTABLE MULTI-LAYER CARD WITH ENTRAPPED SECURITY ELEMENT

BACKGROUND OF THE INVENTION

This invention relates to a laminated multi-layer card or plastic data carrier (identification card or payment card) with an entrapped security element such as a hologram or other Diffractive Optical Variable Image Device (DOVID). The contained holographic information protects against counterfeiting and assures authenticity. Furthermore, this invention relates to low-to-medium-volume production of such cards or plastic data carriers.

Laminated multi-layer cards and plastic data carriers mentioned above are used, among other applications, as credit cards, identification cards for companies' personnel, key cards for hotels, college campus students' identification and so on. Typical applications particularly suitable to this invention, namely low-to-medium-volume production of such cards, are linked on one hand to the high degree of difficulty to duplicate a hologram or other DOVID and, on the other hand, to the need to be run through a thermal printer after the application of the security device. In detail, the typical applications are: identification cards for small and medium sized companies, parking permits, proximity cards, licenses for drivers or pilots or other use, bank cards (special customer cards, temporary monetary instruments, and other cards used by financial institutions). In addition, this invention relates to local government's cards (state, county, city, etc.), law enforcement cards, ski resorts cards and other similar cards, virtually encompassing any card or card-like product requiring a visual authentication device (protection against counterfeiting and authenticity assurance) that, as already mentioned, must be thermally printed subsequent to the application of the hologram or other DOVID.

Data carrying cards such as personal ID cards, company personnel cards, key cards for hotels, student campus cards, vending machine cards, public security cards for fire and police, vehicle toll booth cards, parking permits, proximity cards, driver's licenses, pilots licenses are prepared by an overlamination process wherein the holographic or other security element is added to the surface of the card, and not embedded in the card, after the card has been individualized with specific data. This process is costly and requires special equipment at the individualization stage.

Large volume manufacturing of credit cards employs a hot stamping procedure. The cards are printed either before or after the cards have been laminated, or both before and after lamination. After the printing operation and before embossing the cards with information of an individual person, the cards are stacked in an automated feeder, and then dispensed individually onto a bed of a hot stamping press. A vertically cylindrical press then applies a hologram to the cards in a sequential fashion. The holographic image is transferred to the surface of the card as by heat and pressure. A hot stamping plate, comprised of magnesium, copper or brass, is constructed to have exactly the same size as the stamp area. A hologram transfer foil advances adhesive side down, and an electronic optical sensor is employed to align the holographic image with the hot stamping plate of the press. The final result is a card having the hologram on the top face, or bottom face, of the card. The hologram is very thin and is positioned directly on the surface. It can be readily scratched or even worn away over time. It cannot be printed over due to an uneven surface and also due to metal flaking.

A surface stamped holographic identity card cannot be thermally printed because the card has different thicknesses around the edges of the hologram, the print heads of a thermal printer can readily be damaged by coming into contact with a metallized surface (the hologram), and metal flaking of the hologram can cause shortened useful life of the printing ribbon of the thermal printer.

Methods are known to insert a hot stamp hologram below the surface of the identity card. Another process, similar to the hot-stamping procedure described above, causes the final images to be sub-surface as the hologram images are transferred to the pre-lam sheet. However, the process lacks proper registration of the hologram images and is extremely costly due to the time consuming nature of stamping multiple images onto the pre-laminated sheet at different locations. Furthermore, the lamination process causes serious degradation of the holographic image interference pattern, resulting in poor holographic image quality due to heat stress (visible as a frosting over the entire image or parts of it).

The problem then is that the lamination process can cause distortion of the holographic image. Other methods of overcoming the shortfalls of the hot stamping process are: a modified hot stamping technique wherein a specially designed hot stamping press can form the hologram on the pre-laminated card and subsequently form a protective layer on the security element; and putting the hologram on a film that can be inserted into the pre-laminated card just prior to lamination, the film being the same size as the card.

US Published Patent Application 2003/0127847, to Keller et al, relates to an identity card having a security element wherein the security element is in a plastic or lacquer layer that has a higher softening temperature than the layers of the card between which the security element is embedded.

U.S. Pat. No. 6,772,700, issued to Christen relates to an identity card having a security element located between two laminated layers, the security element being provided with a protective layer that is a carrier film. The security element is firmly adhered to the card body by hot sealing.

U.S. Pat. No. 5,318,816, issued to Yin et al, relates to a laminated hologram decal having a release liner covering the pressure sensitive adhesive layer of the decal.

U.S. Pat. No. 4,597,814, issued to Colgate, Jr., relates to a method of making a n identity card comprising the steps of printing information on a sheet of plastic material, forming a raised pattern on a separate sheet of material to create a 3D holographic image, coating the holographic image sheet with an adhesive material, attaching a pressure sensitive adhesive to one side of the holographic image sheet, placing the holographic image sheet on the surface of the sheet of plastic material for bonding by the pressure sensitive adhesive, overlaminating the surface of the plastic material with a transparent plastic layer to form a sandwich, and applying heat and pressure to the sandwich.

U.S. Pat. No. 4,560,426, issued to Moraw et al, relates to a process for preparing identity cards comprising the steps of: obtaining a card core material, directly transferring information from a recording carrier in an electrophotographic copying device to said card core material to obtain an image carrier, inserting a relief grid image into the image carrier as a security marking, and laminating transparent protective films on both sides of the image carrier that contains a security marking.

The currently available solutions designed to overcome the wear and tear limitations of the hot-stamped hologram (or other DOVID) on the cards, although in general applicable to large manufacturing processes, are not fully suitable for low-to-medium-volume production of cards and data carriers. The cumbersome setup, requirement for new applications equipment and elevated production costs associated with these solutions indicate the need for low-cost procedures, particularly for low-volume to medium-volume production. There is therefore a need for an inexpensive, easy to use procedure to insert the hologram or other planar DOVID inside the cards prior to the lamination process, a procedure specially designed for lower-volume manufacturing.

SUMMARY OF THE INVENTION

According to the present invention, there is provided a process for preparing a laminated printable identity card that can be individualized post-production. The process comprises the following steps. A base sheet comprising at least one base card is obtained. Preferably, the at least one base card contains at least one alignment mark for positioning a DOVID appliqué. The base sheet is preferably a plastic sheet. The base sheet can be either a single layer sheet or a multi-layer sheet. Then there is obtained at least one DOVID appliqué. The DOVID appliqué comprises a DOVID element, an attachment means comprising a pressure sensitive adhesive, and a protective layer. The DOVID appliqué is normally attached in a releasable fashion to a release liner. The release liner is positioned next to the adhesive. The DOVID appliqué is removed from the release liner by hand. The DOVID appliqué is aligned by hand with the at least one base card on the base sheet by employing the at least one alignment mark In an alternative embodiment, the DOVID appliqué is aligned by hand, with the assistance of a template, with the at least one base card on the base sheet. The adhesive layer is positioned next to the base card. The DOVID appliqué is then pressed by hand to the base card to obtain a prelam card with at least one DOVID appliqué. The base card is then laminated on at least the side of the base card containing the DOVID appliqué to obtain a laminated card containing an entrapped holographic element. The laminated card can then be thermally printed to obtain a laminated thermally printed identity card containing an embedded DOVID element. The DOVID appliqué has a thickness of about 25 micrometers to about 50 micrometers. Preferably, the thickness of the DOVID appliqué is about 30 micrometers to about 46 micrometers. Most preferably, the thickness of the holographic element is about 38 micrometers.

The present invention also relates to a laminated printable plastic identity card comprising: a base card, at least one DOVID appliqué and a transparent laminating layer. In one embodiment, the DOVID appliqué can contain a layer of printed information. The layer of printed matter can be non-continuous or continuous. The DOVID appliqué has a thickness of between about 25 micrometers and about 50 micrometers. Preferably, the laminated thermally printable plastic identity card has a DOVID appliqué wherein the thickness is between about 30 micrometers and about 46 micrometers. Most preferably, the DOVID appliqué has a thickness of about 38 micrometers.

DETAILED DESCRIPTION OF THE INVENTION

Figure 1:
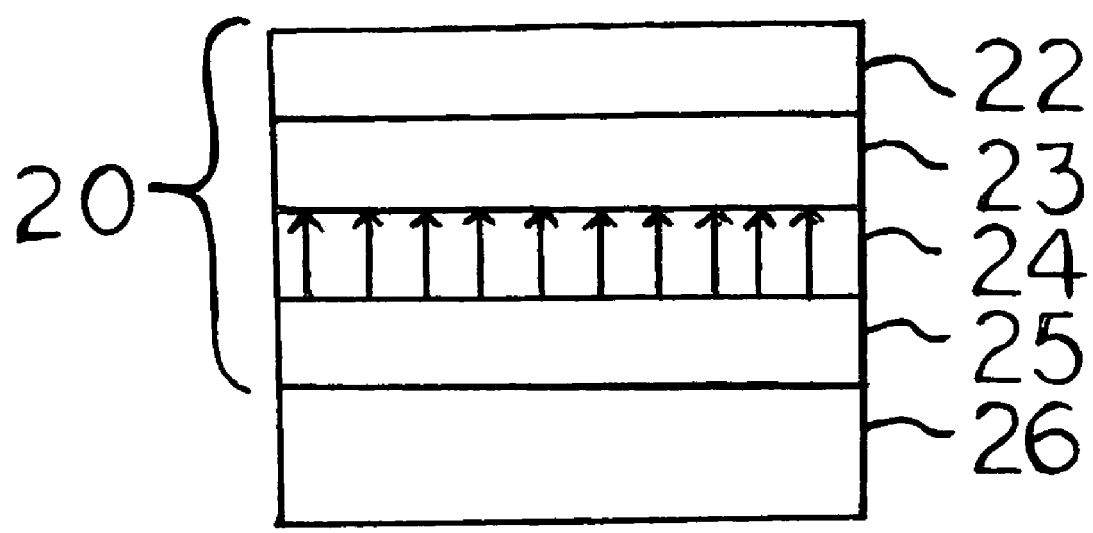
FIG. 1 is a representation of a multi-layered structure comprising a DOVID appliqué and a release liner. The DOVID appliqué can be readily removed from the release liner and attached as by hand to a base sheet.

The holograms or other DOVIDs are manufactured as appliqués. The final appliqué structure is a multi-layer holographic structure comprising the following layers: a chemically coated polyester such as PET (polyethylene terephthalate) layer, a lacquer layer, a reflective coating, a pressure sensitive adhesive and a release liner. The manufacturing process begins with a step of acquiring coated polyester, usually PET 220. Various materials can be employed instead of PET 220, namely PVC (polyvinyl chloride), OPP (oriented polypropylene), TESLIN, acetate, or other plastic film. Thickness is a key element of the invention, as it is especially optimized for the card lamination process. Thickness of the chemically coated PET can be 23 micrometers. A lacquer layer is applied to the chemically coated PET. The lacquer applied is a combination of resins familiar to one skilled in the art, containing acrylics, nitrocellulose etc. The lacquer layer thickness can be 1-2 micrometers. Thicknesses are optimized for the card lamination process.

Subsequently, a reflective coating is applied by vapor deposition on the lacquer layer. Various embodiments could employ vacuum metallization, high refractive index coating and/or de-metallization as is obvious to one skilled in the art. The device can be transparent (with or without a coating such as High Refractive Index (HRI) or de-metallization); or, the device can be fully metallized and/or tinted if desired. In short, this process enhances the brightness of the DOVID. As the type of reflective coating application is not a limiting factor in the present invention, any appropriate application can be employed.

The holograms or other DOVIDs are manufactured through either micro-embossing or casting the groove structure of the hologram image into a plastic film, usually PET (polyester), PVC (polyvinyl chloride), OPP (polypropylene), acetate, or other plastic film. The DOVID element can be transparent (with or without a coating such as High Refractive Index (HRI) demetalization); or, the element can be fully metallized and/or tinted if desired. The DOVID element must be coated with a pressure sensitive adhesive, preferably an acrylic adhesive, to obtain a DOVID appliqué. The final appliqué is kiss cut to desired size and waste is stripped away. Appliqués are stored as strips, sheets or rolls.

Separately, the base cards which are on a base sheet, are printed with registration marks for positioning and aligning of the holograms or other DOVIDs onto the cards. The same base sheet and/or the underside of the clear laminating sheets can be printed with other user defined data and/or graphics, magnetic stripes, etc. The holograms or other DOVIDs are peeled off of the liner by hand and individually placed as accurately as possible onto the base cards on the base sheet at the appointed position shown by the registration marks. Next, excess dust is removed from the base sheet containing the holograms or DOVIDs using, for example, sticky rollers or the like. Subsequently, the base sheets undergo a standard plastic card lamination process. The preferred methods are stack or roll style lamination, but other lamination methods could be employed as well. Next, the individual identity cards are cut out using standard card cutting techniques that can include steel rule die cutting, guillotine cutting with round cornering, rotary die cutting, etc. Cards are then ready for a printing process that can be carried out at the original production facility or at any other facility using standard individualization card imprinting equipment. As the hologram or other DOVID is sub-surface, and does not adversely affect the printable surface, all printing subsequent to the lamination is carried out exactly as it would be with a standard individualized card product.

Thickness optimization previously mentioned as being a key element of the present invention is essentially the thickness of the DOVID appliqué. The optimum appliqué thickness is between about 25 micrometers and about 50 micrometers. If an appliqué is thinner than about 25 micrometers, it tends to break during the hand application process. Extremely thin appliqués are very difficult to apply. Also they can result in image degradation because of lack of protection for the DOVID. Appliqués thicker than about 50 micrometers produce card degradations. Such card degradations affect the surface of the card, thus causing problems during subsequent individualization printing.

As a separate embodiment of the present invention, two holographic appliqués are placed on each face of the base card prior to lamination. Preferably, the two appliqués are not on top of each other, because this affects the overall card thickness. If appliqués are placed on either side of the base card, but one on top of the other, then the appliqué thickness does not exceed 25 micrometers. The final product is a laminated printable individual identity card containing an embedded holographic element on each side of the card.

In an alternative embodiment, an appliqué is placed on the transparent laminating layer prior to lamination together with the base sheet. The final product is again a laminated printable individual identity card containing an entrapped DOVID element on at least one side of the card.

In a preferred embodiment, the base card is a card commonly known as a CR-80 format card. The base sheet that contains a plurality of base cards is commonly known as a sheet from which CR-80 format cards are prepared. The CR-80 format cards are also referred to as "core stock", "core sheet" and "pre-lam sheet". The CR-80 card has dimensions of: 3.375 inches by 2.125 inches (85.6 mm by 54 mm). The thickness of the card can be in the range of 0.02 inches to 0.05 inches. The preferred thickness of the card is 0.03 inches. The present invention can employ larger cards such as those having dimensions of 2 inches by 6 inches, or even larger. The thickness of the cards can be up to about 0.1 inches. The base sheet, and consequently the base card, can be opaque, translucent or transparent.

The laminated multi-layer card containing an entrapped security device, preferably a hologram or other DOVID, can then be printed, embossed or otherwise provided with a wide range of information, including card issuer, customer identification, a logo, terms and conditions and a card expiration date.

The present invention relates to an improvement in a process for preparing a personal identity card. The process comprises the steps of: affixing a DOVID appliqué to a base card by an attachment means comprising a pressure sensitive adhesive layer. The adhesive layer is found on the DOVID appliqué. A preliminary identity card is thus obtained. The preliminary identity card is then laminated in a high pressure laminating process to obtain a laminated preliminary identity card. At least one laminated preliminary identity card is then cut out from the base sheet. The laminated preliminary identity card is finally printed with personal information to obtain a personal identity card. The improvement in the process is employing a DOVID appliqué containing a pressure sensitive adhesive outer layer, wherein the DOVID appliqué has a specific thickness. The DOVID appliqué that contains the pressure sensitive adhesive outer layer has a thickness of between about 25 micrometers and about 50 micrometers. Preferably, the DOVID appliqué has a thickness of between about 30 micrometers and 46 micrometers. Most preferably, the DOVID appliqué has a thickness of about 38 micrometers. The DOVID appliqué comprises a DOVID element, an attachment means comprising a pressure sensitive adhesive and a protective layer.

The present invention relates to a laminated printable plastic identity card comprising a base card, a pressure sensitive DOVID appliqué and a transparent laminating layer. The present invention also relates to a laminated printed plastic identity card comprising a base card, a pressure sensitive DOVID appliqué, a transparent laminating layer and printed data. In a preferred embodiment, the data is thermally printed. In an alternative embodiment, the DOVID appliqué is printed with data prior to the lamination step.

Referring to FIG. 1, a multi-layered structure is depicted. The multi-layered structure contains a DOVID element 24 and a release liner 26. A DOVID appliqué 20 is constructed of an optional data layer 22, a protective layer 23, a DOVID element 24 and an attachment means comprising an adhesive layer 25. A customized data layer 22 is an optional layer that is obtained by printing on a protective layer 23. The arrows in the DOVID element 24 represent the direction of the "right reading" side of the DOVID (or hologram). The "wrong reading" side of the DOVID (or hologram) is at the base of the arrows, and the "right reading" side of the DOVID (or hologram) is at the pointed side of the arrows. Once the DOVID appliqué 20 is peeled from the release liner 26, it can be placed on a substrate such as PET, TESLIN and the like. The "right reading" side of the DOVID element 24 is positioned away from the substrate for easy viewing. The DOVID element 24 is held firmly to the substrate by means of the adhesive layer 25. Various types of printing can then be employed. The protective layer 23 covers a DOVID element 24. The adhesive layer 25 is positioned between the DOVID element 24 and a release liner 26. The DOVID element 24 comprises a diffractive structure and a reflectivity element (not shown).

Figure 2:
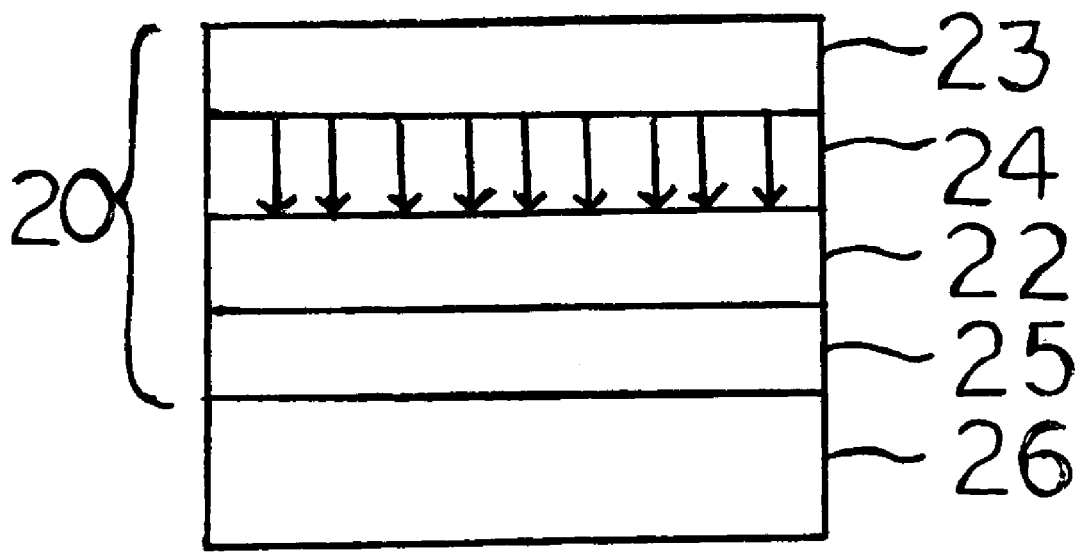
FIG. 2 is a representation of an alternative embodiment of a DOVID appliqué and a release liner. In this alternative embodiment, the DOVID appliqué can be readily removed from the release liner and placed by hand on a transparent sheet that is to be laminated to a base sheet.

Referring to FIG. 2, there is depicted a multi-layered structure. The structure represents an alternative embodiment of the present invention. The multi-layered structure contains a DOVID element 24 and a release liner 26. A DOVID appliqué 20 is constructed of an adhesive layer 25, an optional customized data layer 22, a protective layer 23 and the DOVID element 24. The adhesive layer 25 is positioned next to the release liner 26. The arrows in the DOVID element 24 represent the direction of the "right reading" side of the DOVID (or hologram). The "wrong reading" side of the DOVID (or hologram) is at the base of the arrows, and the "right reading" side of the DOVID (or hologram) is at the pointed side of the arrows. Once the DOVID appliqué 20 is peeled from the release liner 26, it can be placed on a transparent laminating layer (not shown) rather than on a base card. Adhesive layer 25 holds the DOVID appliqué 20 securely to the transparent laminating layer. The "right reading" side of the DOVID element 24 can then be viewed through the adhesive layer 25 and through the transparent laminating layer.

Figure 3:
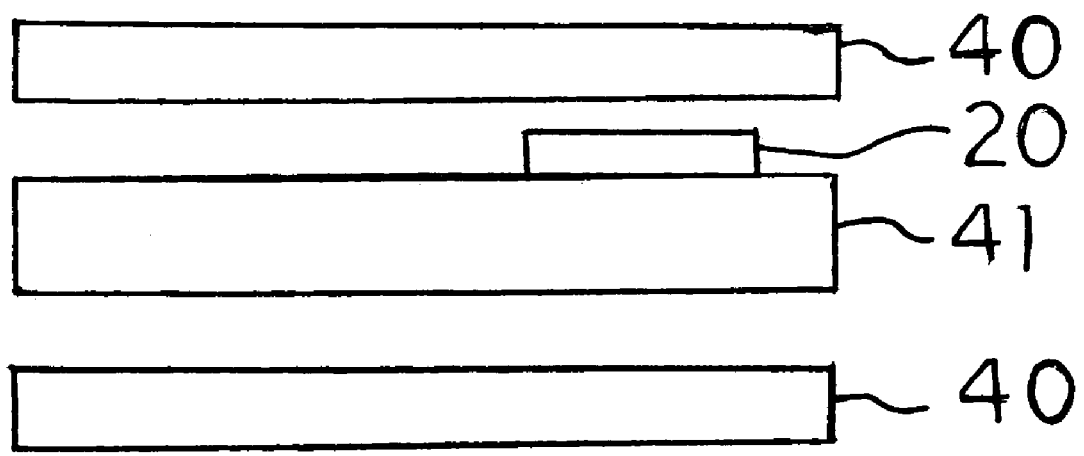
FIG. 3 is a representation of a process of the present invention. A base card contains on one surface thereof a DOVID appliqué. The DOVID appliqué is removed from the release liner and placed as by hand on the base card. The Figure further represents transparent layers that are to be laminated to the top and the bottom of the base card.

Referring to FIG. 3, a process of the present invention is represented. The figure represents the laminating step of the present process. A base card 41 containing a DOVID appliqué 20 is in the process of being laminated by two transparent laminating sheets 40. In an alternative embodiment, only the top laminating sheet 40 is employed.

Figure 4:
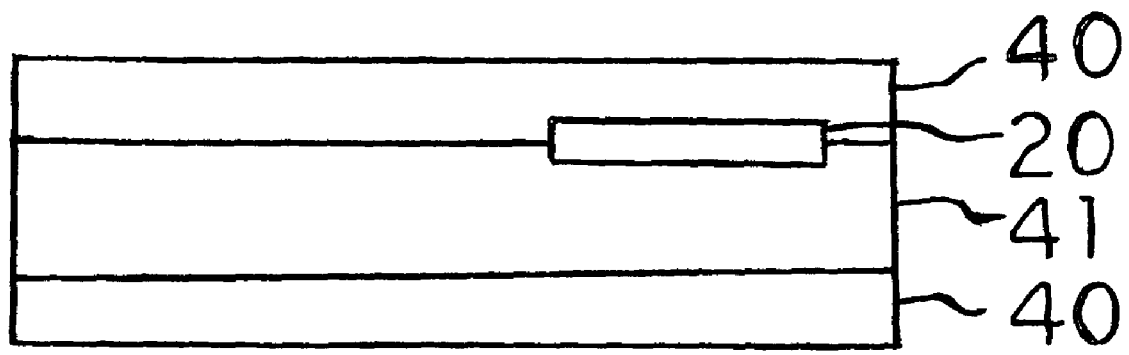
FIG. 4 is a representation of a final product of the present invention. A printable laminated identity card comprises a base card, an entrapped DOVID appliqué that is sub-surface and a top and bottom transparent laminant layer. The DOVID appliqué is in a sub-surface position relative to both the base card and the transparent layer because of the lamination step of the present invention.

Referring to FIG. 4, a final printable product of the present invention is represented. The printable product comprises transparent laminating sheets 40, a DOVID appliqué 20 and a base card 41. The DOVID appliqué is sub-surface and is entrapped within the transparent sheet 40 and the base card 41.

Figure 5:
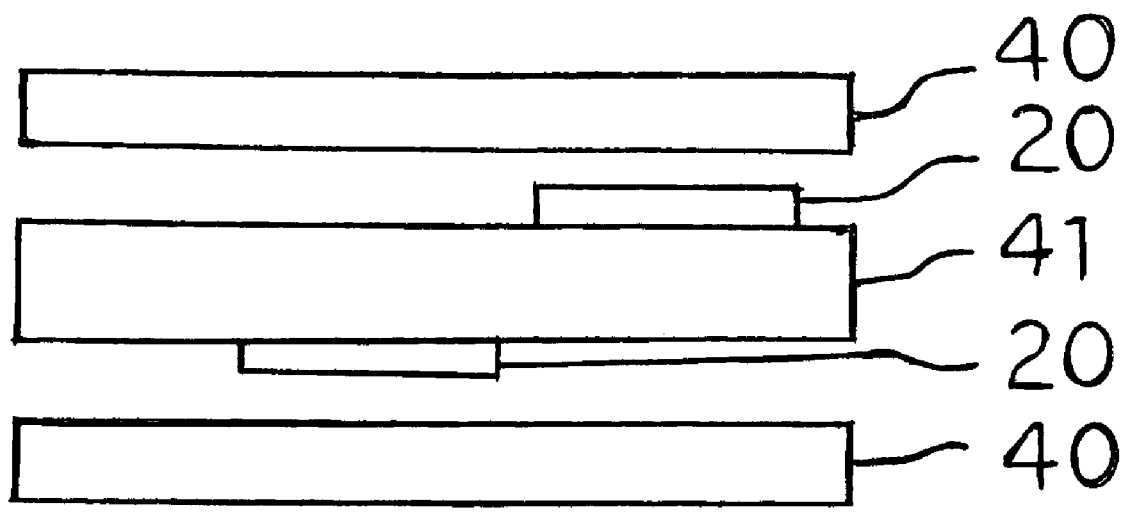
FIG. 5 is a representation of a base card such as TESLIN containing on both surfaces thereof a DOVID appliqé that has been removed from a release liner and placed as by hand on the base card. The Figure further represents transparent laminant layers that are to be laminated onto the top and the bottom of the base card.

Referring to FIG. 5, a process of the present invention is represented. The figure represents the laminating step of an alternative embodiment of the present process. A base card 41 containing two DOVID appliqués 20 is in the process of being laminated by two transparent laminating sheets 40.

Figure 6:
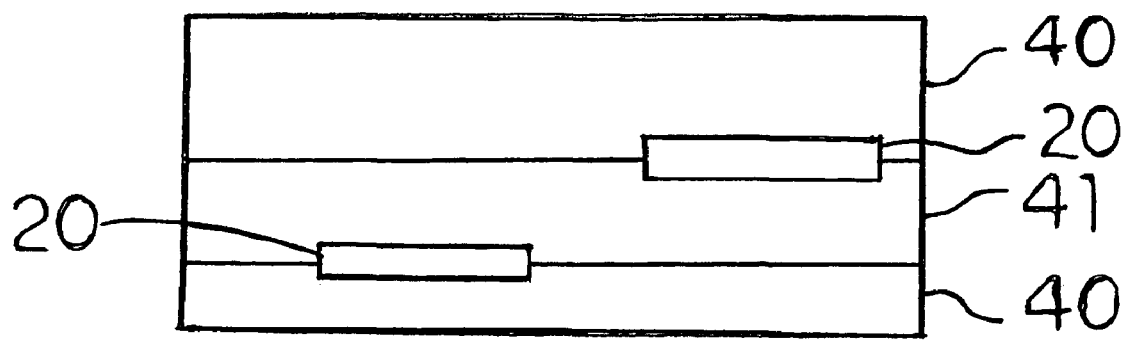
FIG. 6 is a representation of a final product of the present invention. A printable laminated identity card comprises a base card, an entrapped DOVID appliqué on each side of the base card, and a top and bottom transparent laminant layer. The DOVID appliqués are both in a sub-surface position relative to both the base card and the transparent layers due to the lamination process of the present invention.

Referring to FIG. 6, a final printable product of an alternative embodiment of the present invention is represented. The printable product comprises transparent laminating sheets 40, a base sheet 41 and two DOVID appliqués 20.

Figure 7:
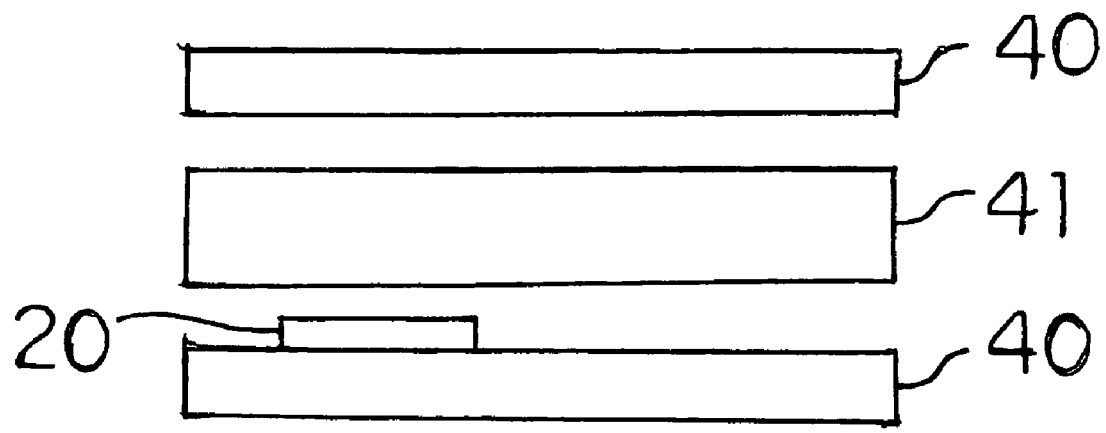
FIG. 7 is a representation of an alternative process of the present invention and subsequent product thereof. A transparent laminant layer contains on one surface thereof a DOVID appliqué that has been removed from a release liner and placed by hand on the transparent layer. The figure further represents a base card such as TESLIN positioned between two transparent layers that are to be laminated to the base card to obtain a final product.

Referring to FIG. 7, a process of the present invention is represented. The figure represents the laminating step of an alternative embodiment of the present process. A base card 41 such as TESLIN is in the process of being laminated by two transparent laminating sheets 40. One of the transparent sheets 40 contains a DOVID appliqué 20. The DOVID appliqué 20 employed is the appliqué represented in FIG. 2.

Figure 8:
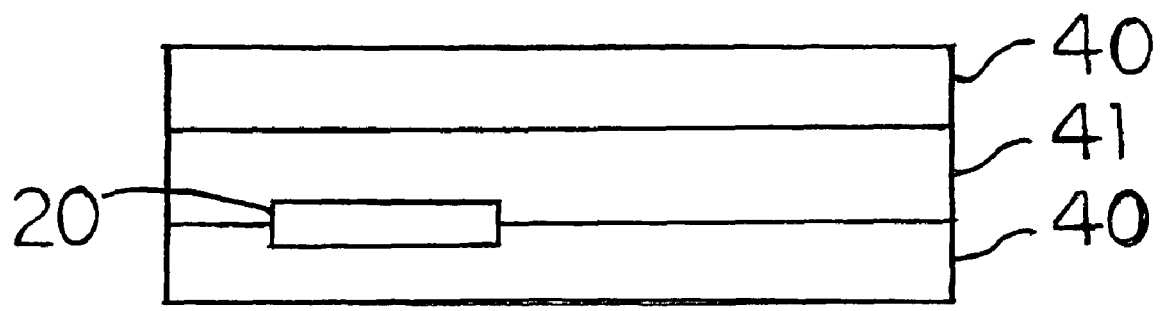
FIG. 8 is a representation of a final product of the present invention prepared according to the alternative process as represented in FIG. 7. The final product is a printable laminated identity card containing an entrapped DOVID appliqué that is sub-surface.

Referring to FIG. 8, a final printable product of an alternative embodiment of the present invention is represented. The printable product comprises transparent laminating sheets 40, a base sheet 41 and a DOVID appliqué 20. The product represents a product made according to FIG. 7.

Figure 9:
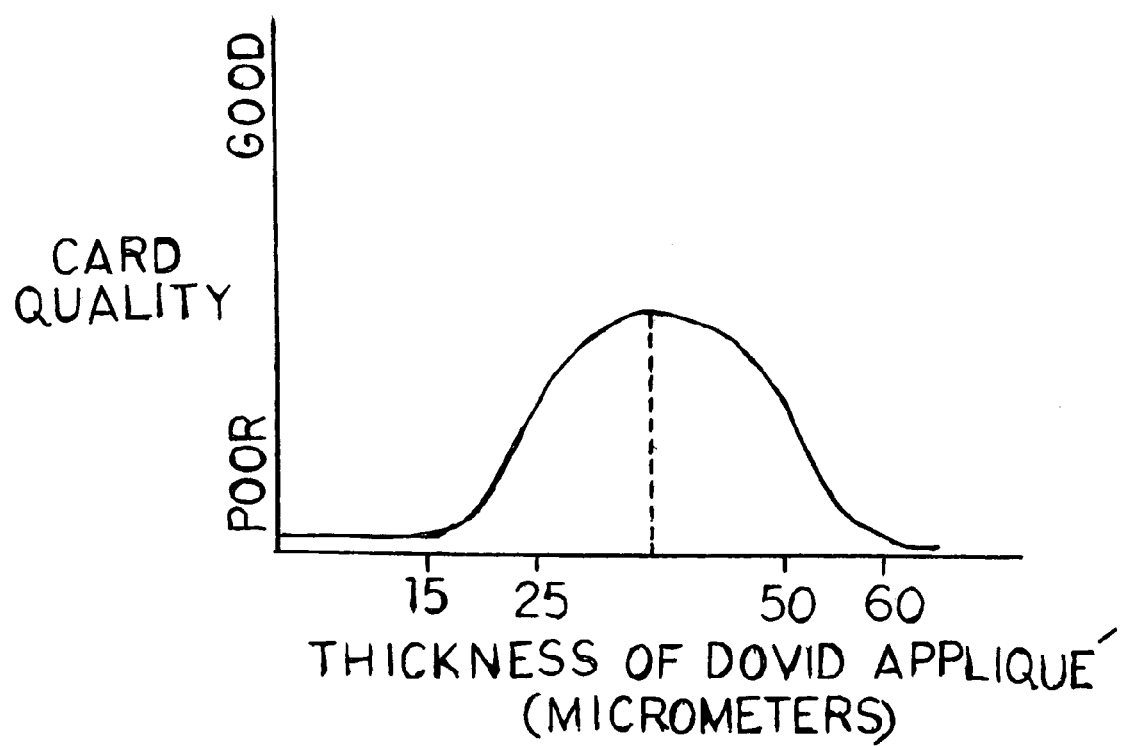
FIG. 9 is a graphic representation of the thickness of the DOVID appliqué relative to the overall quality of the printed identity card.

Referring to FIG. 9, there is represented a graphic disclosure of the relationship between the quality of the printed identity card and the thickness of the DOVID appliqué. Optimum quality is obtained when the thickness of the DOVID appliqué is about 38 micrometers.

In the process of the present invention, the DOVID appliqué 20 is aligned with the base card 41 that is a part of the base sheet, the alignment being obtained by means of one alignment mark, a series of alignment marks or a template. The DOVID appliqué 20 comprises a DOVID element. The DOVID element comprises a diffractive structure and a reflectivity element.

The DOVID appliqué is preferably attached to a release liner. The release liner is a member selected from the group consisting of a strip, a sheet and a roll. The release liner is positioned next to the adhesive layer for easy removal by hand. Upon removal of the release liner, the pressure sensitive adhesive layer is exposed for contact with the base card 41.

Once the first DOVID appliqué 20 is attached by hand to the base card 41 of the base sheet, it is pressed by hand to remove any air bubbles or the like. The remaining DOVID appliqués 20 are similarly affixed by hand to the remaining base cards 41 on the base sheet. In a preferred embodiment, the base sheet comprises a sheet from which CR80 format cards are cut. The base card 41 is a CR80 format card. After the DOVID appliqués 20 are securely attached to the base cards as by pressure sensitive adhesive means to obtain pre-laminated cards (prelam cards), the base sheet containing the prelam cards is laminated on at least one side. Preferably, the base sheet containing the prelam cards is laminated on both sides with a transparent laminating layer 40. If only one side of the base sheet is laminated, then it is the side that contains the DOVID appliqués 20. Methods of lamination with a transparent laminating layer 40 include stack lamination and roll lamination.

After lamination, at least one identity card is cut from the laminated sheet (the base sheet) that contains a plurality of laminated identity cards. The cutting operation is a member selected from the group consisting of: guillotine cutting, steel rule die cutting, rotary die cutting, water jet cutting, laser cutting and the like. The at least one card can then be printed either on the premises or at some other location.

In a process for preparing a personal identity card comprising the steps of: affixing a DOVID appliqué comprising a pressure sensitive adhesive to a base sheet containing a plurality of base cards to obtain a preliminary identity card, laminating the preliminary identity card in a high pressure laminating process to obtain a laminated preliminary identity card, cutting out at least one laminated preliminary identity card from the base sheet, and printing the laminated preliminary identity card with personal information to obtain a personal identity card, the improvement comprises employing a DOVID appliqué having a thickness of between about 25 micrometers and about 50 micrometers.

While the invention has been described by specific examples and embodiments, there is no intent to limit the inventive concept except as set forth in the following claims.

I claim:

1. A process for preparing a laminated printable plastic identity card containing at least one entrapped Diffractive Optical Variable Image Device (DOVID) element, the process comprising the steps of:
   (1) obtaining a base sheet comprising at least one base card;
   (2) obtaining at least one DOVID appliqué comprising a DOVID element, an attachment means comprising a pressure sensitive adhesive, and a protective layer, the DOVID appliqué having a thickness of about 25 micrometers to about 50 micrometers;
   (3) customizing the at least one DOVID appliqué as by an individualized printing process; the individualized printing process being a member selected from the group consisting of: bar code printing, sequential number printing, name printing, logo printing, graphics printing and text printing;

(4) aligning by hand the at least one DOVID appliqué with the at least one base card as by a positioning means, the positioning means being a member selected from the group consisting of at least one alignment mark and a template, the attachment means of the DOVID appliqué being positioned next to the at least one base card;

(5) pressing by hand the at least one DOVID appliqué to the at least one base card to remove air bubbles and to obtain at least one prelamination card (prelam card), the prelam card comprising a multi-layer structure comprising a base card, an attachment means comprising a pressure sensitive adhesive, a DOVID element, the DOVID element comprising a diffractive structure and a reflectivity element, and a protective layer;

(6) laminating the at least one prelam card with a transparent laminating layer on at least one side of the prelam card, the at least one side being the side containing the at least one DOVID element, to obtain a laminated printable plastic identity card containing at least one entrapped DOVID element.

2. A process according to claim 1 further comprising the steps of (7) optionally, cutting out at least one laminated identity card from the base sheet, and;

(8) printing the laminated identity card to obtain a laminated printed identity card containing an entrapped DOVID element.

3. A process according to claim 2 wherein the printing step is a member selected from the group consisting of thermal printing, ink jet printing, dye sublimation printing, laser printing and transfer printing.

4. A process according to claim 2 wherein the optional step of cutting out the at least one card is a member selected from the group consisting of guillotine cutting, steel rule die cutting, rotary die cutting, water jet cutting and laser cutting.

5. A process according to claim 2 wherein the base card has a size comprising a CR80 format sheet.

6. A process according to claim 1 wherein the base sheet is a member selected from the group consisting of polyethylene terephthalate (PET), polyvinylchloride (PVC), oriented polypropylene (OPP), and TESLIN.

7. A process according to claim 1 wherein the base sheet is a member selected from the group consisting of a transparent sheet, a translucent sheet and an opaque sheet.

8. A process according to claim 1 wherein the DOVID element is a prepared according to a process which is a member selected from the group consisting of micro-embossing and casting.

9. A process according to claim 8 wherein the DOVID element is a member selected from the group consisting of a transparent hologram and a metallized hologram.

10. A process according to claim 1 wherein the DOVID element is a member selected from the group consisting of a continuous pattern hologram and non-continuous image hologram.

11. A process according to claim 1 wherein the DOVID appliqué has a thickness of about 30 micrometers to about 46 micrometers.

12. A process according to claim 11 wherein the DOVID appliqué has a thickness of about 38 micrometers.

13. A process according to claim 1 wherein the DOVID appliqué is obtained by removing as by hand the appliqué from a release liner.

14. A process according to claim 13 wherein the release liner is a member selected from the group consisting of a strip, a sheet and a roll.

15. A process according to claim 1 wherein the laminating step is a member selected from the group consisting of stack lamination and roll lamination.

16. A laminated printable plastic identity card prepared according to the process of claim 1.

* * * * *